United States Patent [19]

Hurley et al.

[11] Patent Number: 5,410,015

[45] Date of Patent: Apr. 25, 1995

[54] POLYAMIDES HAVING A LOW WATER ABSORPTIVITY

[75] Inventors: James Hurley, Mannheim; Walter Goetz, Ludwigshafen; Gerd Blinne, Bobenheim, all of Germany

[73] Assignee: BASF Aktiengesellschaft, Ludwigshafen, Germany

[21] Appl. No.: 86,461

[22] Filed: Jul. 6, 1993

Related U.S. Application Data

[63] Continuation-in-part of Ser. No. 902,203, Jun. 22, 1992, abandoned.

[30] Foreign Application Priority Data

Jun. 22, 1991 [DE] Germany ............ 41 20 661.4

[51] Int. Cl.$^6$ ............ C08G 69/28; C08K 5/13
[52] U.S. Cl. ............ 528/336; 528/310; 528/322; 528/492; 528/495; 524/160; 524/324; 524/325; 524/326; 524/330; 524/342
[58] Field of Search ............ 528/492, 495, 336, 310, 528/322; 524/100, 330, 324–326, 342

[56] References Cited

U.S. PATENT DOCUMENTS

| | | | |
|---|---|---|---|
| 3,651,010 | 3/1972 | Cowell et al. | 524/342 |
| 3,655,819 | 4/1972 | Crescentini | 524/342 |
| 3,941,850 | 3/1976 | Brindell et al. | 524/342 |
| 4,173,541 | 11/1979 | Molt | 524/342 |
| 4,507,420 | 3/1985 | Rosenberger | 524/342 |
| 4,513,100 | 4/1985 | Rosenberger | 524/342 |
| 4,628,069 | 12/1986 | Meyer et al. | 524/171 |
| 4,745,146 | 5/1988 | Meyer et al. | 524/339 |

*Primary Examiner*—John Kight, III
*Assistant Examiner*—P. Hampton-Hightower
*Attorney, Agent, or Firm*—Keil & Weinkauf

[57] ABSTRACT

Thermoplastic polyamide molding materials contain, as essential components,

A) from 39 to 99% by weight of a polyamide or a mixture of different polyamides and B) from 1 to 30% by weight of a phenol of the general formula I $$R_3 E \qquad\qquad I$$

and E is a trivalent, aliphatic, $C_1$–$C_{10}$-hydrocarbon radical, triazinetriyl or a trivalent $C_6$- or $C_{10}$-aryl radical, and c) from 0 to 60% by weight, based on the amount of polyamide, of fibrous or particulate fillers or a mixture thereof.

3 Claims, No Drawings

POLYAMIDES HAVING A LOW WATER ABSORPTIVITY

The subject application is a continuation-in-part of application Ser. No. 07/902,203, which was filed Jun. 22, 1992, now abandoned.

The present invention relates to thermoplastic polyamide molding materials containing, as essential components, A) from 39 to 99% by weight of a polyamide or a mixture of different polyamides, B) from 1 to 30% by weight, based on the amount of polyamide, of a phenol of the general formula I $$R_3E \qquad\qquad I$$

unsubstituted 3- or 4-hydrophenyl and E is a trivalent, aliphatic, $C_1$–$C_{10}$-hydrocarbon radical, triazinetriyl or a trivalent $C_6$- or $C_{10}$-aryl radical, and C) from 0 to 60% by weight, based on the amount of polyamide, of fibrous or particulate fillers or a mixture thereof.

The present invention furthermore relates to a process for the preparation of such thermoplastic molding materials and to their use for the production of fibers, films and moldings and to the moldings obtainable from the thermoplastic molding materials as essential components.

It is known that polyamides which can be processed by a thermoplastic method are capable of absorbing water. However, the strength and the rigidity of the products can in general be reduced by a half as a result. Furthermore, the water absorption generally leads to changes in dimensions and hence to distortion of the parts. To reduce the water absorption, for example, phenol compounds may be added to the polyamides. Thus, EP-A 112 542 describes the addition of compounds which contain a phenolic OH group to polyamides, and EP-A 224 847 and EP-A 240 887 describe polyamide molding materials which can be processed by a thermoplastic method and to which bisphenol compounds have been added. A disadvantage in using the phenols described to date is essentially the volatility of these substances. This frequently leads to deposits, especially during injection molding. Furthermore, the volatility is undesirable for toxicological reasons. Another disadvantage is the reduction in the heat distortion resistance.

It is an object of the present invention to overcome these disadvantages.

We have found that this object is achieved by the thermoplastic molding materials defined at the outset.

The polyamides which can be used are known per se. Examples of these are polyhexamethyleneadipamide, polyhexamethylenepimelamide, polyhexamethylenepimelamide, polyhexamethyleneazelaamide, polyhexamethylenesebacamide, polyhexamethylenedodecanediamide, polyoctamethylenesuberamide, polydodecamethylenedodecanediamide, poly-11-aminoundecanamide and bis-(4-aminocyclohexyl)-methyldodecanamide or the products obtained by ring cleavage of lactams, for example polycaprolactam or polylaurolactam. Polyamides based on terephthalate or isophthalic acid as the acid component and/or trimethylhexamethylenediamine, bis-(4-aminocyclohexyl)-methane or 2,2-di-(4-aminocyclohexyl)-propane as the diamine component and polyamide base resins which have been prepared by copolymerization of two or more of the abovementioned polymers or their components are also suitable. A copolycondensate of terephthalic acid, isophthalic acid, hexamethylenediamine and caprolactam (nylon 6/6T) may be mentioned as an example of this.

Semicrystalline polyamides, preferably nylon 6, nylon 66, nylon 6/6T, nylon 66/6T (copolycondensate of hexamethylenediamine, adipic acid, caprolactam, terephthalic and isophthalic acid) and nylon 46, are preferably used.

These polyamides are prepared in a conventional manner (cf. for example Encyclopedia of Polymer Science and Engineering, Vol. 11, pages 315 to 489, John Wiley & Sons, Inc. 1988).

In general, the molecular weights of the polyamides are chosen in the range from 8,000 to 50,000, preferably from 12,000 to 30,000, g/mol (number average molecular weight).

The ratio of terminal acid groups to terminal amino groups can be controlled by varying the molar ratio of the starting compounds.

The amount of the polyamide in the novel molding material is from 39 to 99, preferably from 50 to 98, % by weight.

The amount of the phenols I, $R_3E$, in the thermoplastic molding materials is from 1 to 30, preferably from 2 to 20, % by weight.

Suitable radicals E are trivalent, alphatic $C_1$–$C_{10}$-hydrocarbon radicals, triazinetriyl and trivalent $C_5$–$C_{10}$-aryl radicals. Examples are $C_1$–$C_{10}$-alkanetriyl radicals, such as methylidyne, ethylidyne, 1-ethanyl-2-ylidene, 1,2,3-propanetriyl, 1-propanyl-2-ylidene, 1-propanyl-3-ylidene, propylidyne, butylidyne, 1-butanyl-4-ylidene, 2-butanyl-4-ylidene, 2-butanyl-1-ylidene, 1-butanyl-2-ylidene, pentylidyne, 1,3,5-pentanetriyl, hexylidyne, 1,2,6-hexanetriyl, heptylidyne, 1-heptanyl-7-ylidene, octylidyne, 1-octanyl-8-ylidene, nonylidyne, and decylidyne, preferably methylidyne, ethylidyne, 1-ethanyl-2-ylidene, 1,2,3-propanetriyl, 1-propan-2-ylidene, butylidyne, and 2-butanyl-4-ylidene, and 1,2,4- and 1,3,5-triazinetriyls, such as 1,2,4-triazine-3,5,6triyl and 1,3,5-triazine-2,4,6-triyl, preferably 1,3,5-triazine-2,4,6-triyl and trivalent phenyl radicals, such as 1,2,4-, 1,2,5-, 1,2,6-, 1,3,4- and 1,3,5-benzenetriyl, preferably 1,3,5-benzenetriyl.

Examples of compounds I which are particularly important with regard to the present invention are tris(p-hydroxyphenyl)methane, tris-1,1,1-(p-hydroxyphenyl)-ethane, tris-1,1,3-(p-hydroxyphenyl)-propane, tris-1,1,3-(p-hydroxyphenyl)-butane, bis-1,1-(p-hydroxy-phenyl)-1-((4-p-hydroxyphenyl)-cyclohexyl)-methane,

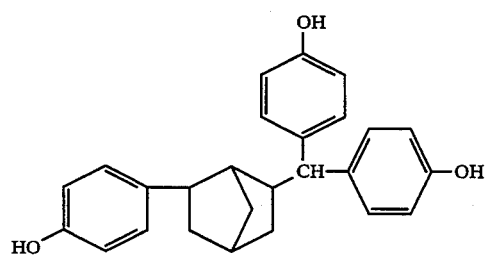

and

-continued

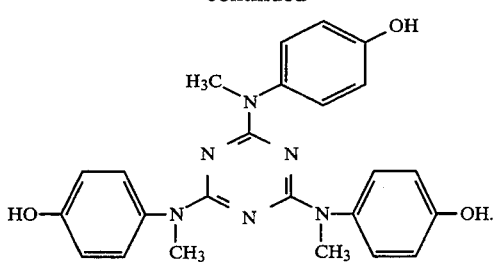

The preparation of the phenols I is known per se and is carried out, as a rule, by condensing aldehydes or ketones with phenol or phenol compounds. Thus, tris1,1,1-(p-hydroxyphenyl)ethane can be prepared, for example, from phenol and p-hydroxyphenyl methyl ketone (cf. for example Houben-Weyl, Methoden der organischen Chemie, Vol. 6/1c, page 1021 et seq.). Furthermore, the aldehydes or ketones may be olefinically unsaturated, such as acrolein, or olefinically unsaturated compounds, such as dienes, for example norbornadiene or dicyclopentadiene, may be reacted with phenols (cf. for example Houben-Weyl, Methoden der organischen Chemie, Vol. 6/1c, page 950 et seq.). The triazine compounds can be prepared, for example, from cyanuric chloride and aminophenols by known methods (cf. s-Triazines and Derivatives in The Chemistry of Heterocyclic Compounds, A. Weissberger Ed., Interscience Publishers, 1959, New York, pages 55–57).

The novel molding materials may contain, as component C), from 0 to 60, in particular from 10 to 50, % by weight of a fibrous or particulate filler or a mixture of such fillers.

Glass fibers, carbon fibers, Aramid fibers, potassium titanate fibers and fibrous silicates, such as wollastonite, may be mentioned here merely as examples of fibrous fillers, glass fibers being preferred.

When glass fibers are used, they may be provided with a size and an adhesion promoter for better compatibility with the thermoplastic polyamide.

In general, the glass fibers used have a diameter of from 6 to 20 μm. They may be incorporated in the form of both short glass fibers and rovings. In the finished injection molding, the mean length of the glass fibers is preferably from 0.08 to 5 mm.

Glass spheres, particulate wollastonite, quartz powder, boron nitride, kaolin, calcium carbonate (chalk), magnesium carbonate and titanium dioxide may be mentioned here merely as typical examples of particulate fillers, in general wollastonite, titanium dioxide and kaolin being preferred.

In addition to the essential components, polyamide, (B) and (C), the novel molding materials may contain conventional additives and processing assistants. The amount of these is as a rule up to 10, preferably up to 5, % by weight, based on the total weight of the components polyamide, (B) and (C).

Examples of conventional additives are stabilizers and antioxidants, heat stabilizers and UV stabilizers, lubricants and mold release agents, dyes, pigments, plasticizers and flameproofing agents.

Antioxidants and heat stabilizers which may be added to the thermoplastic materials according to the invention are, for example, halides selected from the group consisting of metals of the group I of the Periodic Table, for example lithium, sodium and potassium halides, and copper(I) halides, for example chlorides, bromides or iodides, or mixtures thereof. Zinc chloride and zinc fluoride may also be used. Sterically hindered phenols, hydroquinones, substituted members of this group and mixtures of these compounds, preferably in concentrations of up to 1% by weight, based on the weight of the mixture, may also be employed.

Examples of UV stabilizers are substituted resorcinols, salicylates, benzotriazoles and benzophenones, which may be used in general in amounts of up to 2% by weight.

Lubricants and mold release agents, which as a rule can be added to the thermoplastic material in an amount of up to 1% by weight, are, for example, stearic acid, stearyl alcohol, alkyl stearates and stearamides as well as esters of pentaerythritol with long-chain fatty acids.

For example, red or black phosphorus or a phosphorus-containing compound can be used as the flameproofing agent, in amounts of from 3 to 10% by weight.

A preferred flameproofing agent is elemental phosphorus, in particular in combination with glass fiber-reinforced molding materials, and the elemental phosphorus may be used in untreated form.

However, particularly suitable formulations are those in which the phosphorus has been coated on the surface with low molecular weight liquid substances, such as silicone oil, liquid paraffin or esters of phthalic acid or adipic acid, or with polymeric or oligomeric compounds, for example with phenol resins or aminoplasts and polyurethanes.

Further preferred flameproofing agents are organic phosphorus compounds, such as the esters of phosphoric acid, phosphorous acid, phosphonic acid and phosphinic acid and tertiary phosphines and phosphine oxides. An example is triphenylphosphine oxide. This may be used alone or as a mixture with hexabromobenzene or a chlorinated biphenyl and, if desired, antimony trioxide.

Other suitable flameproofing agents are compounds which contain phosphorus-nitrogen bonds, such as phosphonitrile chloride, phosphoric ester amides, phosphoramides, phosphinamides, tris(aziridinyl)phosphine oxide or tetrakis(hydroxymethyl)phosphonium chloride.

The preparation of the novel molding materials is carried out, as a rule, by known processes, by mixing the starting components in a conventional mixing apparatus, such as an extruder, a Brabender mill or a Banbury mill, and then extruding the mixture. After extrusion, the extrudate is generally cooled and is comminuted. The mixing temperatures are generally chosen in the range from 200° to 350° C., preferably from 225° to 325° C.

Compared with corresponding molding materials without the conventional mono- or diphenol additives, the novel thermoplastic molding materials have in particular lower water absorption and a substantially improved surface quality. This prevents a decrease in the rigidity and in the strength. In comparison with the corresponding molding materials containing the conventional phenol additives, improvements are achieved with regard to the rigidity, the strength, the heat distortion resistance, the amount of surface coating and the surface quality. The novel molding materials are accordingly suitable for the production of moldings of any type, preferably for the production of fiber-reinforced, in particular glass fiber-reinforced molding materials or molding materials provided with reinforcing fillers.

EXAMPLE 1

20 kg/h of polycaprolactam having a number average molecular weight of 15,000 g/mol (Ultramid ®B3 from BASF AG) and a viscosity number of 150 cm³/g (in sulfuric acid according to ISO 307, DIN 53, 727) were melted at 270° C. in a twin-screw extruder (ZSK 30 from Werner & Pfleiderer) and mixed with 0.83 kg/h of tris-(p-hydroxyphenyl)-ethane at 250 rpm. The mixture was extruded and the extrudates were cooled and granulated.

EXAMPLE 2

The procedure was as in Example 1, except that, instead of 0.83 kg/h, 1.74 kg/h of tris(p-hydroxyphenyl)ethane were used.

EXAMPLE 3

The procedure was as in Example 1, except that, instead of 0.83 kg/h, 2.73 kg/h of tris(p-hydroxyphenyl)-ethane were used.

EXAMPLE 4

40 kg/h of polycaprolactam having a number average molecular weight of 15,000 g/mol (Ultramid® B3 from BASF AG) and a viscosity number of 150 cm³/g (in sulfuric acid according to ISO 307, DIN 53, 727) were melted at 280° C. in a twin-screw extruder (ZSK 53 from Werner & Pfleiderer) and mixed with 18.5 kg/h of glass fibers (Star Stran 761, 10 μm, from Manville) and 3.1 kg/h of tris(p-hydroxyphenyl)ethane at 120 rpm. The mixture was extruded and the extrudates were cooled and granulated.

Comparative Example V1

The procedure was as in Example 1, except that no tris(p-hydroxyphenyl)ethane was used.

Comparative Example V2

The procedure was as in Example 1, except that 1.74 kg/h of bisphenol A was used instead of tris(p-hydroxyphenyl)ethane.

Comparative Example V3

The procedure was as in Example 4, except that no tris(p-hydroxyphenyl)ethane was used.

Comparative Example V4

The procedure was as in Example 4, except that 3.1 kg/h of bisphenol A were used instead of tris(p-hydroxyphenyl)ethane.

A part of the granules from Examples 1 to 4 and Comparative Examples V1 to V4 was dried at 80° C. and 40 mbar and then injection molded at 280° C. to give dumbbells, as used for strength measurements according to DIN 53,455. Another part of these granules was processed on a type BSKM 400 machine to give test boxes (similarly to the publication of Ultramid (Series: BASF Plastics, Issue 6/1985, FIG. 7, page 14)).

The modulus of elasticity was determined according to DIN 53,457, and the tensile strength according to DIN 53,455. The water absorption was measured after storage for 25 days in water at 30° C.

The surface was also assessed visually.

The heat distortion resistance was determined according to DIN 53,461.

The properties of the blends are summarized in the Table.

TABLE

| Example | without glass fibers | | | | | with glass fibers | | |
|---|---|---|---|---|---|---|---|---|
|  | 1 | 2 | 3 | V1 | V2 | 4 | V3 | V4 |
| Polyamide (% by weight) | 96 | 92 | 88 | 100 | 92 | 65 | 70 | 65 |
| Phenol* | THPE | THPE | THPE | — | BP-A | THPE | — | BP-A |
| (% by weight) | 4 | 8 | 12 | — | 8 | 5 | — | 5 |
| Filler (% by weight) | — | — | — | — | — | 30 | 30 | 30 |
| Modulus of elasticity (N/mm³) | 3150 | 3100 | 3050 | 3100 | 3100 | 8650 | 8600 | 8550 |
| Strength (N/mm³) | 81 | 80 | 74 | 82 | 82 | 181 | 180 | 178 |
| Water absorption (% by weight) | 7.4 | 6.0 | 5.3 | 9.5 | 6.1 | 4.3 | 6.5 | 4.2 |
| Heat distortion resistance (°C.) | 70 | 65 | 60 | 68 | 62 | 196 | 208 | 190 |
| Coating (mg) | <1 | <1 | 2 | <1 | 5 | <1 | <1 | 3 |
| Surface quality | good | very good | very good | good | good | good | moderate | good |

*THPE = Tris(p-hydroxyphenyl)ethane; BP-A = Bisphenol A

We claim:

1. A thermoplastic polyamide molding material containing, as essential components,
   A) from 39 to 99% by weight of a polyamide or a mixture of different polyamides and
   B) from 1 to 30% by weight of a phenol of the formula I $$R_3E \qquad I$$

wherein R is an unsubstituted 3- or 4-hydroxyphenyl radical and E is [a trivalent, aliphatic, $C_1$–$C_{10}$-hydrocarbon radical,] triazinetriyl or a trivalent $C_6$- or $C_{10}$-aryl radical, and
   C) is from 0 to 60% by weight, based on the amount of polyamide, of fibrous or particulate fillers or a mixture thereof.

2. A molding obtained from a thermoplastic polyamide molding material as claimed in claim 1.

3. A thermoplastic polyamide molding material as defined in claim 1, wherein the phenol of the formula I is selected from the group consisting of tri(p-hydroxyphenyl)methane, tris-1,1,1-(p-hydroxyphenyl)-ethane, tris-1,1,3-(p-hydroxyphenyl)-propane, tris1,1,3-(p-hydroxyphenyl)-butane,bis-1,1-(p-hydroxyphenyl)-1-((4-p-hydroxyphenyl )-cyclohexyl )-methane,

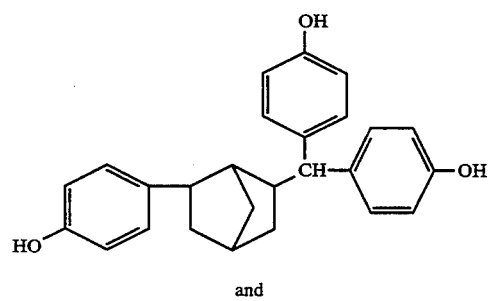

and

-continued
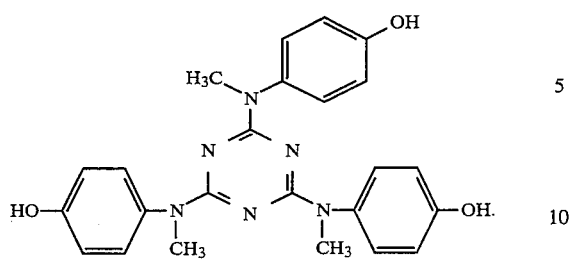
* * * * *

UNITED STATES PATENT AND TRADEMARK OFFICE
CERTIFICATE OF CORRECTION

PATENT NO. : 5,410,015
DATED : April 25, 1995
INVENTOR(S) : Hurley, et. al.

It is certified that error appears in the above-indentified patent and that said Letters Patent is hereby corrected as shown below:

Column 6, claim 3, line 51, "tri" should read --tris--.

Column 6, claim 3, line 53, "trisl," should read --tris-1,--.

Signed and Sealed this

Eleventh Day of July, 1995

Attest:

BRUCE LEHMAN

Attesting Officer    Commissioner of Patents and Trademarks